M. KORNDÖRFER.
METHOD OF AND APPARATUS FOR STARTING ALTERNATING CURRENT MOTORS.
APPLICATION FILED MAY 15, 1908.
1,096,922.
Patented May 19, 1914.
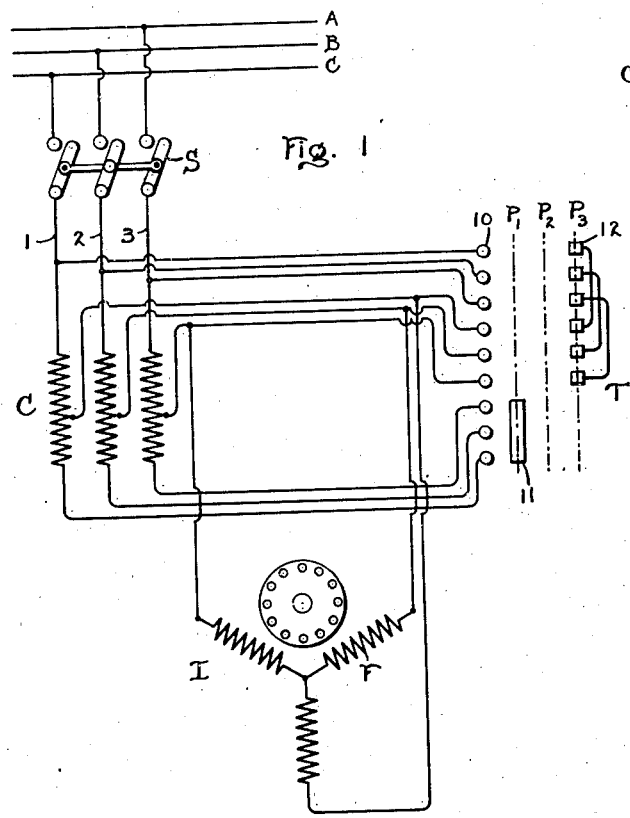
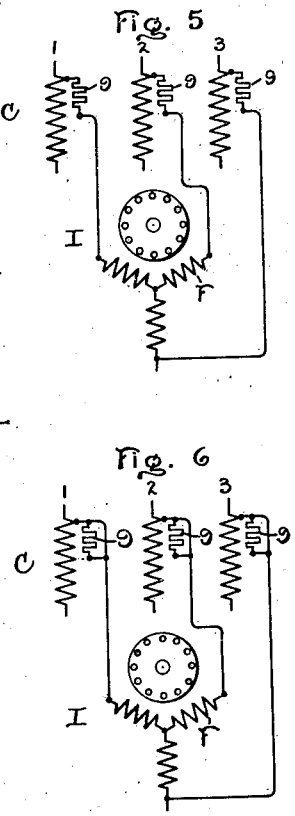
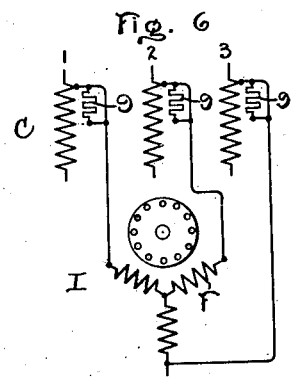
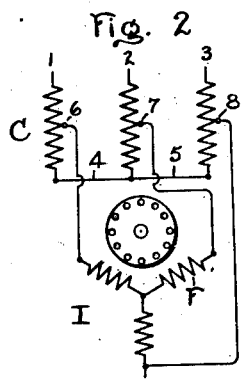
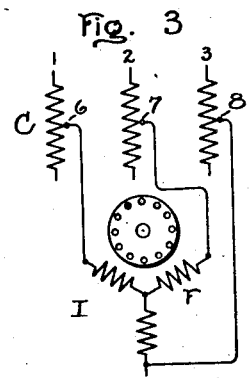
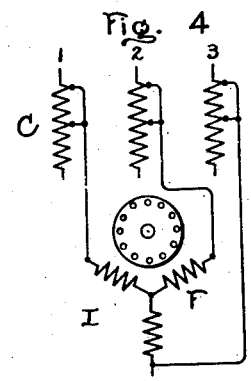
WITNESSES:
J. Earl Ryan
J. Ellis Glen
INVENTOR
MAX KORNDÖRFER.
BY Albert G. Davis
ATT'Y.

UNITED STATES PATENT OFFICE.

MAX KORNDÖRFER, OF PANKOW, GERMANY, ASSIGNOR TO GENERAL ELECTRIC CO., A CORPORATION OF NEW YORK.

METHOD OF AND APPARATUS FOR STARTING ALTERNATING-CURRENT MOTORS.

1,096,922. Specification of Letters Patent. Patented May 19, 1914.

Application filed May 15, 1908. Serial No. 433,065.

*To all whom it may concern:*

Be it known that I, MAX KORNDÖRFER, a subject of the King of Prussia and Emperor of Germany, residing at Pankow, Germany, have invented certain new and useful Improvements in Methods of and Apparatus for Starting Alternating-Current Motors, of which the following is a specification.

My invention relates to the starting of electric motors, and more particularly to the starting of alternating current motors, which are started by means of a compensator for impressing a voltage lower than the line voltage upon the motor terminals which are subsequently connected to the full line voltage, and has for its object an improvement in this method of starting motors.

In the past it has been customary to start alternating current motors with a compensator, which has an intermediate tap or taps to which the motor terminals are connected, and after the motor has obtained nearly its full speed, its terminals may be connected directly to the full line voltage. The disadvantage of this method is that there is a sudden rush of the current taken by the motor when the starting switch or controller is altered so as to change the connections of the motor terminals from one intermediate tap to another on the compensator, or to full line voltage, since, when the circuit is interrupted the motor loses more or less of its magnetization and hence when the current is renewed after this interruption, it will be renewed with a sudden rush. In case it is desired to avoid this sudden rush of current, choke coils may be introduced which can be switched into the motor circuit between the time of connecting its terminals from one voltage to the next succeeding higher voltage, and thus there will be no interruption in the current, the motor will lose none of its magnetization and hence there will be no sudden increased rush of current. If either of these methods be used the apparatus is complicated and costly, since if only one step be used in starting the motor, the choke coils used must be large, or if a number of steps be used, while the choking coils may be smaller, the switch must be complicated and hence expensive.

The objects of my invention are then to provide a method of and a device for starting alternating current motors without an interruption in the starting current, or without the use of the expensive and complicated apparatus which has been used in the past, for avoiding this rush of current. I accomplish this object by the use of a starting compensator or electromotive force regulating device, which is so arranged that after the motor is started by connecting its terminals to taps of the starting compensator that will give a voltage lower than the line voltage upon the motor terminals, the compensator or electromotive force regulating device is connected so as to become a reactive coil in series between the line voltage and the motor terminals. This will cause a voltage to be impressed upon the motor terminals intermediate that impressed by the starting taps on the compensator and the full line voltage, since only about one-half the number of windings of the compensator will be effective as a reactive coil, and since the compensator or starting transformer may be wound for a high saturation on account of the short period of its operation. The motor will then receive a somewhat higher impressed voltage than that given by the low voltage taps on the compensator or electromotive force regulating device, and its terminals may then be connected directly to the line voltage by short circuiting that portion of the compensator used as a reactive coil. The current will therefore rise without any sudden rush, since the motor at no time has lost its magnetization or its torque.

For further understanding of my invention, reference may be had to the accompanying drawing where—

Figure 1 shows diagrammatically the circuits for starting a three phase motor with my new method; Figs. 2, 3 and 4 show diagrammatically the connections for the various steps used in starting the motor; and Figs. 5 and 6 show a modification which may be introduced into the method of starting.

Referring first to Fig. 2, I have shown a three-phase autotransformer compensator or electromotive force regulating device C, which has terminals 1, 2 and 3 which may be connected to a suitable source of alternating current supply. 1 is an alternating current motor which I have shown as a three phase induction motor, but it will be obvious that other forms of motor may be used. Compensator or electromotive force regulating device C is wound for a three-phase circuit and is Y connected by means of conductors 4 and 5 by which I mean that the windings of the compensator are connected together by these conductors to form what is commonly known as a neutral point. The device C has intermediate taps 6, 7 and 8, which in starting, are connected to the field winding F of the motor 1. After the motor has attained a considerable speed, connections 4 and 5 are broken, that is, the neutral point of the compensator or electromotive force regulating device is opened, so that the circuits will be as shown in Fig. 3 and the compensator or electromotive force regulating device will act as a three-phase reactive coil in series between the source of supply and the motor. After a desired length of time has elapsed, that portion of the compensator or electromotive force regulating device winding which acts as a reactive coil, may be short circuited and the terminals of the motor connected directly to the line voltage, as shown in Fig. 4.

Figs. 5 and 6 show a modification of the above described connections, in that after the compensator or electromotive force regulating device has been connected so as to act as a reactive coil, instead of connecting the motor terminals directly to the line voltage, they may be connected in series with voltage consuming devices 9, shown in Fig. 5, so as to make the gradation in voltage between the steps shown in Figs. 5 and 6 less than that shown between Figs. 3 and 4. Subsequent to the connection shown in Fig. 5 the voltage consuming devices 9 may be short circuited as shown in Fig. 6, when the motor will be running with its terminals connected to the full line voltage with the same connection as shown in Fig. 4.

Fig. 1 shows a diagram of connections for making the steps described, in a simple manner by the use of a controller T, and a three-phase switch S. A B and C are line conductors fed from a suitable source of three-phase alternating current supply. Controller T is formed in the well known manner with stationary fingers 10 and movable contacts 11 and 12 and is shown as having three positions diagrammatically marked by the lines $P_1$, $P_2$ and $P_3$. Compensator or electromotive force regulating device C has its terminals 1, 2 and 3 connected to a switch S and its intermediate voltage taps and the connections for joining its neutral point connected to fingers 10 of controller T. There are also connections between terminals 1, 2 and 3 and fingers 10 on the controller. If switch S be closed and the controller moved into the first position so that contact 11 closes the neutral point of the compensator or electromotive force regulating device, the motor will start up with a reduced voltage derived from the compensator or electromotive force regulating device. If the controller be now moved into position shown by $P_2$ so that there will be no movable contacts connecting fingers 10, the neutral point of the compensator will be opened and the compensator will act as a reactive coil in series with the motor. When the controller is moved into position shown by $P_3$ so that contacts 12 make contact with fingers 10, full line voltage will be impressed upon the motor terminals as the running condition for the motor.

While I have described a certain succession of connections, I may, if I so desire, start the motor with the neutral point of the compensator or electromotive force regulating device opened and then close the neutral point so that the compensator will act as a compensator and then use the successive connections previously described.

The advantage of first connecting the compensator as a reactive coil instead of a compensator, is that it causes a lower voltage to be impressed upon the motor terminals than would be the case for the connection with the neutral point of the compensator closed, and this may be advantageous in the starting of high voltage motors. The reason that a low voltage will be impressed upon the motor terminals with the neutral point of the compensator open, is that the short circuit current of the motor will be greatly in excess of the normal current or the no load current, and this will cause the voltage drop upon that portion of the compensator used as a reactive coil to be much in excess of the voltage across the motor. This voltage drop across the compensator used as a reactive coil may be so great that the motor will not start with this connection, but will have a certain voltage impressed upon it. But when the next step is taken in starting the motor, that is when the neutral point of the compensator is made, a sufficient voltage will be impressed upon the motor terminals to start the motor without the large change of voltage which results if the motor terminals be directly connected to the intermediate tap on the compensator with its neutral point connected so that it acts as a compensator. In starting a motor with this latter succession of steps the switch S, Fig. 1 would be thrown without moving the controller T. The circuits would then be as shown in Fig. 3. The controller would then be thrown to its various successive points so that the connections shown in Figs. 2, 3 and 4 would successively result, or the modifications shown in Fig. 5 and 6 might be used. The position $P_2$ of the controller, the connection shown in Fig. 3, need not be held so long as it is in the other positions.

It will be obvious to those skilled in the art that while I have described my invention as applied to a three phase motor it may be also applied to motors of other numbers of phases.

While I have described a certain method and arrangement of connections, I do not limit myself to this method and arrangement, but seek in the appended claims to cover all those methods and arrangements which will be obvious to those skilled in the art that may be included within the scope of my invention.

What I claim as new and desire to secure by Letters Patent of the United States, is,—

1. The method of operating an electromotive force regulating device for starting electrical apparatus from a source of supply, consisting in connecting it at one time as a reactive coil and at another time as a compensator between the apparatus and the source.

2. The method of operating an electromotive force regulating device for starting electrical apparatus from a source of supply, which consists in connecting it successively as a reactive coil, then as a compensator, and then again as a reactive coil between the apparatus and the source.

3. The method of operating an electromotive force regulating device for starting electrical apparatus from a source of supply, which consists in connecting it successively as a reactive coil and then as a compensator between the apparatus and the source.

4. The method of operating an electromotive force regulating device for starting electrical apparatus from a source of supply, which consists in connecting it successively as a compensator and then as a reactive coil between the apparatus and the source.

5. The method of operating electromotive force regulating devices having their windings adapted to be connected together to form a neutral point and having taps intermediate the terminals of the windings, for starting electrical apparatus consisting in connecting the apparatus to the taps, then opening the neutral point of the device and then connecting full line voltage to the apparatus.

In witness whereof, I have hereunto set my hand this 30 day of April, 1908.

MAX KORNDÖRFER.

Witnesses:
 ALFRED KRAUSE,
 HANS ACKERMAN.